(12) United States Patent
Suzuki et al.

(10) Patent No.: US 10,084,202 B2
(45) Date of Patent: Sep. 25, 2018

(54) METHOD FOR PRODUCING SULFIDE SOLID ELECTROLYTE MATERIAL

(71) Applicant: TOYOTA JIDOSHA KABUSHIKI KAISHA, Toyota-shi, Aichi-ken (JP)

(72) Inventors: Tomoya Suzuki, Susono (JP); Shigenori Hama, Shunntou-gun (JP); Naoki Osada, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/896,557

(22) PCT Filed: Apr. 14, 2014

(86) PCT No.: PCT/JP2014/060596
§ 371 (c)(1),
(2) Date: Dec. 7, 2015

(87) PCT Pub. No.: WO2014/208180
PCT Pub. Date: Dec. 31, 2014

(65) Prior Publication Data
US 2016/0133989 A1 May 12, 2016

(30) Foreign Application Priority Data
Jun. 28, 2013 (JP) .................................. 2013-137321

(51) Int. Cl.
*H01M 10/0562* (2010.01)
*C03C 3/32* (2006.01)
(Continued)

(52) U.S. Cl.
CPC ......... *H01M 10/0562* (2013.01); *C01B 25/14* (2013.01); *C03C 3/323* (2013.01);
(Continued)

(58) Field of Classification Search
None
See application file for complete search history.

(56) References Cited

U.S. PATENT DOCUMENTS 4,585,714 A    4/1986  Akridge
6,066,417 A    5/2000  Cho et al.
(Continued)

FOREIGN PATENT DOCUMENTS

CN    1918668 A       2/2007
CN    103125044 A     5/2013
(Continued)

OTHER PUBLICATIONS

Dec. 12, 2016 Office Action issued in U.S. Appl. No. 14/897,332.
(Continued)

*Primary Examiner* — Jonathan G Leong
*Assistant Examiner* — Christopher P Domone
(74) *Attorney, Agent, or Firm* — Oliff PLC (57) ABSTRACT

A sulfide solid electrolyte material having high Li ion conductivity can be obtained by providing a method for producing a sulfide solid electrolyte material that has peaks at $2\theta=20.2°$ and $2\theta=23.6°$ in an X ray diffraction measurement using a CuKα ray, the method including steps of: an amorphizing step of obtaining sulfide glass by amorphization of a raw material composition that contains at least $Li_2S$, $P_2S_5$, LiI and LiBr and a heat treatment step of heating the sulfide glass at a temperature of 195° C. or higher.

3 Claims, 5 Drawing Sheets

(51) Int. Cl.
    *C03C 4/18*     (2006.01)
    *H01M 10/052*     (2010.01)
    *H01B 1/10*     (2006.01)
    *C03C 10/00*     (2006.01)
    *C01B 25/14*     (2006.01)

(52) U.S. Cl.
    CPC ............... *C03C 4/18* (2013.01); *C03C 10/00* (2013.01); *H01B 1/10* (2013.01); *H01M 10/052* (2013.01); *H01M 2300/0068* (2013.01)

(56) References Cited

U.S. PATENT DOCUMENTS

| | | |
|---|---|---|
| 2007/0160911 A1 | 7/2007 | Senga et al. |
| 2011/0065007 A1 | 3/2011 | Kamiya et al. |
| 2013/0177821 A1 | 7/2013 | Tsuchida et al. |
| 2014/0141341 A1 | 5/2014 | Ohtomo et al. |
| 2015/0207170 A1* | 7/2015 | Aburatani ............... H01B 1/10 429/306 |

FOREIGN PATENT DOCUMENTS

| | | |
|---|---|---|
| JP | S0628467 A | 1/1987 |
| JP | H05-306117 A | 11/1993 |
| JP | H05-306119 A | 11/1993 |
| JP | H0536117 A | 11/1993 |
| JP | H11-73993 A | 3/1999 |
| JP | 2012048971 A | 3/2012 |
| JP | 2013-016423 A | 1/2013 |
| JP | 2014-029796 A | 2/2014 |
| WO | 2013/005085 A1 | 1/2013 |

OTHER PUBLICATIONS

Ujiie et al, "Preparation and Ionic Conductivity of (100-c)(0.8Li2S 0.2P2S5) c LiI glass=ceramic electrolytes," Journal of Solid State Electrochemistry, vol. 17, No. 3, pp. 675-680, 2012.
Sep. 18, 2017 Office Action issued in U.S. Appl. No. 14/897,332.
Mar. 15, 2018 Office Action issued in U.S. Appl. No. 14/897,332.

* cited by examiner

METHOD FOR PRODUCING SULFIDE SOLID ELECTROLYTE MATERIAL

TECHNICAL FIELD

The present invention relates to a method for producing a sulfide solid electrolyte material by which a sulfide solid electrolyte material having high Li ion conductivity can be obtained.

BACKGROUND ART

In accordance with a rapid spread of information related devices and communication devices such as a personal computer, a video camera and a cellular phone in recent years, the development of a battery to be utilized as a power source thereof has been emphasized. The development of a high-output and high-capacity battery for an electric automobile or a hybrid automobile has been under progress also in an automobile industry. Among various kinds of batteries, a lithium battery has been presently noticed from the viewpoint of having a high energy density.

Liquid electrolyte containing a flammable organic solvent is used for a presently commercialized lithium battery, so that the installation of a safety device for restraining temperature increase during a short circuit or the improvement in structure and material for preventing the short circuit is necessary therefor. In contrast, a lithium battery all-solidified by replacing the liquid electrolyte with a solid electrolyte layer has a simplified safety device and it is considered to be excellent in terms of production cost and productivity for the reason that the flammable organic solvent is not used in the battery. Furthermore, as a solid electrolyte material used for a solid electrolyte layer, a sulfide solid electrolyte material is known.

As the sulfide solid electrolyte material has high Li ion conductivity, it is useful for obtaining high output of a battery. Thus, various studies have been conventionally made. For example, in Patent Literature 1, it is disclosed that glass ceramics can be obtained by heat treatment of LiI—$Li_2S$—$P_2S_5$-based sulfide glass. Further, in Patent Literature 2, it is disclosed that the Li ion conductivity can be improved by adding LiI, LiCl, LiBr, or the like to $Li_2S$—$P_2S_5$-based sulfide solid electrolyte. Further, in Patent Literature 3, $Li_2S$—$P_2S_5$—LiX—$Li_2CO_3$-based solid electrolyte is disclosed. Incidentally, X represents I, Cl, or Br. Still further, in Patent Literature 4, adding a plurality of LiI, LiCl, LiBr, or the like to $Li_3PO_4$—$Li_2S$—$P_2S_5$-based solid electrolyte is disclosed.

CITATION LIST

Patent Literature

Patent Literature 1: Japanese Patent Application Publication (JP-A) No. 2013-016423
Patent Literature 2: JP-A No. 2012-048971
Patent Literature 3: JP-A No. S62-008467
Patent Literature 4: JP-A No. H05-306117

SUMMARY OF INVENTION

Technical Problem

In Patent Literature 1, a high Li ion conducting phase having peaks at $2\theta=20.2°$ and $23.6°$ and a low Li ion conducting phase having peaks at $2\theta=21.0°$ and $28.0°$ are disclosed. From the viewpoint of ion conductivity, it is preferable that the high Li ion conducting phase has high crystallinity. However, when the heat treatment temperature is increased in order to have higher crystallinity, a low Li ion conducting phase is generated so that it is difficult to increase the Li ion conductivity. Furthermore, when the heat treatment is carried out at low temperature at which a low Li ion conducting phase is not generated, the crystallinity of a high Li ion conducting phase cannot be increased. For such reasons, it is also difficult for the case to have increased Li ion conductivity.

The present invention is achieved in view of the above circumstances, and a main object is to provide a method for producing a sulfide solid electrolyte material by which a sulfide solid electrolyte material having high Li ion conductivity can be obtained.

Solution to Problem

To solve the aforementioned problems, inventors of the present invention conducted intensive studies. As a result, it was found that, when LiBr is added to a raw material composition of LiI—$Li_2S$—$P_2S_5$-based sulfide glass, generation of low Li ion conducting phase can be suppressed even when the heat treatment temperature is high. The present invention is completed based on this finding.

Specifically, the present invention provides a method for producing a sulfide solid electrolyte material that has peaks at $2\theta=20.2°$ and $2\theta=23.6°$ in an X ray diffraction measurement using a CuKα ray, the method comprising steps of: an amorphizing step of obtaining sulfide glass by amorphization of a raw material composition that contains at least $Li_2S$, $P_2S_5$, LiI and LiBr; and a heat treatment step of heating the sulfide glass at a temperature of 195° C. or higher.

According to the present invention, by using a raw material composition containing LiBr, generation of a low Li ion conducting phase can be suppressed even when the heat treatment temperature is high. Accordingly, it is possible to obtain a sulfide solid electrolyte material having high Li ion conductivity.

According to the invention, the sulfide solid electrolyte material preferably has no peaks at $2\theta=21.0°$ and $28.0°$.

According to the invention, it is preferable that a ratio of the LiI is more than 5 mol % and less than 15 mol % in the raw material composition and a ratio of the LiBr is equal to or more than 10 mol % and equal to or less than 20 mol % in the raw material composition.

Advantageous Effects of Invention

The present invention exhibits an effect of allowing obtainment of a sulfide solid electrolyte material having high Li ion conductivity.

DESCRIPTION OF EMBODIMENTS

Hereinbelow, the method for producing a sulfide solid-electrolyte material is described in detail.

Figure 1:
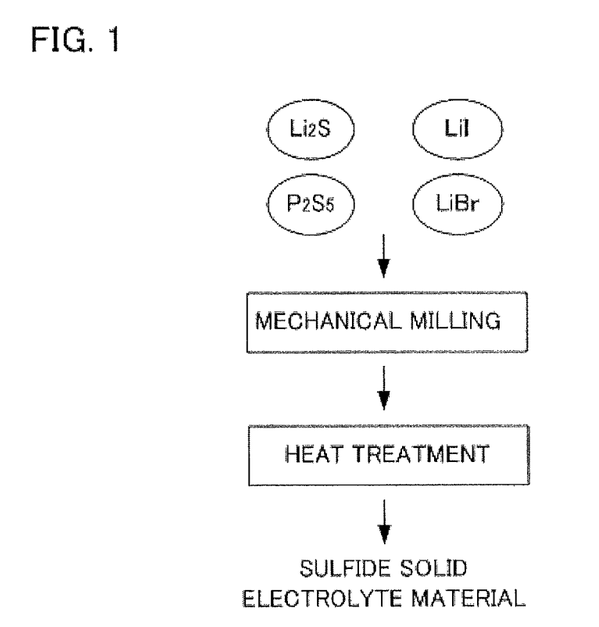
FIG. 1 is a flowchart illustrating an exemplary method for producing a sulfide solid electrolyte material of the present invention.

FIG. 1 is a flowchart illustrating an exemplary method for producing a sulfide solid electrolyte material of the present invention. Regarding FIG. 1, a raw material composition containing $Li_2S$, $P_2S_5$, LiI, and LiBr is prepared first. Next, by performing mechanical milling of the raw material composition, a sulfide glass consisting of an ion conductor having Li, P, and S (for example, $Li_3PS_4$) and LiI and LiBr is synthesized. Next, by subjecting the sulfide glass to a heat treatment at a temperature of 195° C. or higher, a sulfide solid electrolyte material that has peaks at $2\theta=20.2°$ and $2\theta=23.6°$ in an X ray diffraction measurement using a CuKα ray is obtained.

According to the present invention, by using a raw material composition containing LiBr, generation of a low Li ion conducting phase can be suppressed even when the heat treatment temperature is high. Accordingly, a sulfide solid electrolyte material having high Li ion conductivity can be obtained.

As described above, when the heat treatment temperature is increased to have high crystallinity of a high Li ion conducting phase, a low Li ion conducting phase is generated so that it is difficult to increase the Li ion conductivity. Furthermore, when the heat treatment is performed at a low temperature at which no low Li ion conducting phase is generated, it is impossible to increase the crystallinity of a high Li ion conducting phase. For such reasons, it is also difficult for the case to have high Li ion conductivity. In fact, in Patent Literature 1, a high Li ion conducting phase is not generated at a heat treatment temperature of more than 190° C.

As described above, it is difficult to increase the crystallinity of a high Li ion conducting phase while suppressing the generation of a low Li ion conducting phase, and it is believed that such difficulty is caused by precipitation temperature ranges of both conducting phases that are close to each other. On the other hand, it was found in the present invention that, according to differential thermal analysis, a tiny exothermic peak present at higher temperature side than the exothermic peak of a high Li ion conducting phase corresponds to an exothermic peak of a low Li ion conducting phase. It was also found that the tiny exothermic peak can be shifted to a high temperature side by adding LiBr. Accordingly, generation of the low Li ion conducting phase can be suppressed even when the heat treatment temperature is raised. Furthermore, by raising the heat treatment temperature, it is possible to increase the crystallinity of a high Li ion conducting phase.

Hereinbelow, each step of the method for producing a sulfide solid electrolyte material of the present invention is described.

1. Amorphizing Step

According to the present invention, the amorphizing step is a step of obtaining a sulfide glass by amorphization of a raw material composition containing at least $Li_2S$, $P_2S_5$, LiI, and LiBr.

The raw material composition of the present invention contains $Li_2S$, $P_2S_5$, LiI, and LiBr. Ratio of each raw material in the raw material composition is not particularly limited. Moreover, the ratio of $Li_2S$ relative to the total of $Li_2S$ and $P_2S_5$ is preferably in the range of 70 mol % to 80 mol %, more preferably in the range of 72 mol % to 78 mol %, and even more preferably in the range of 74 mol % to 76 mol %. That is because, by having the composition near the ortho-composition described below, a sulfide solid electrolyte material with high chemical stability can be provided.

Furthermore, the total ratio of LiI and LiBr in the raw material composition is not particularly limited if it is a ratio allowing the obtainment of a desired sulfide solid electrolyte material. However, it is preferably in the range of 10 mol % to 35 mol %, for example. It is more preferably in the range of 10 mol % to 30 mol %, and even more preferably in the range of 15 mol % to 25 mol %.

The ratio of LiBr relative to the total of LiI and LiBr (LiBr/(LiI+LiBr)) is not particularly limited and any ratio can be employed. Although the LiBr ratio is not particularly limited, it is preferably a ratio allowing the obtainment of Li ion conductivity which is equal to or higher than that of the sulfide solid electrolyte material which has been produced in the same manner except that it has composition in which LiBr is replaced with LiI (that is, sulfide solid electrolyte material as a subject for comparison). More preferably, it is a ratio allowing obtainment of higher Li ion conductivity than the sulfide solid electrolyte material as a subject for comparison. As for the specific examples of the sulfide solid electrolyte material as a subject for comparison, Comparative Example 2-1 relating to Examples 2-1 to 2-6 described below can be mentioned. The LiBr ratio is in the range of 1 mol % to 99 mol %, and preferably in the range of 5 mol % to 75 mol %.

Furthermore, according to the present invention, it is preferable that the LiI is more than 5 mol % and less than 15 mol % in the raw material composition and the LiBr ratio is equal to or more than 10 mol % and equal to or less than 20 mol % in the raw material composition, because a sulfide glass with high robustness can be obtained. As described herein, the robustness means the obtainment of desired Li ion conductivity even when the heat treatment temperature is slightly different from a target temperature. When such sulfide glass is used, in particular, a sulfide solid electrolyte material having high Li ion conductivity can be obtained even when the heat treatment temperature is raised. Furthermore, from the viewpoint of enhancing the robustness, ratio in the raw material composition is preferably higher than ratio in the raw material composition. The total ratio of LiI and LiBr in the raw material composition is preferably 20 mol % or more, for example. Furthermore, the LiBr ratio relative to LiI is preferably in the range of 1 to 2, for example.

Incidentally, when the sulfide solid electrolyte material has composition of $a((1-b)LiI.bLiBr).(1-a)(cLi_2S.(1-c)$ $P_2S_5$), "a" corresponds to the total ratio of LiI and LiBr, "b" corresponds to the LiBr ratio, and "c" corresponds to the $Li_2S$ ratio.

The sulfide glass obtained by an amorphizing step is preferably a material satisfying $(T_{cx}-T_{c1}) \geq 55°$ C., when the high Li ion conducting phase is c1, the low Li ion conducting phase is cx, and, in differential thermal analysis, temperature of the exothermic peak of c1 is $T_{c1}$ and temperature of the exothermic peak of cx is $T_{cx}$, because generation of a low Li ion conducting phase can be suppressed. Furthermore, the differential thermal analysis is generally performed at the following conditions. Namely, a TG-DTA device (for example, Thermo plus EVO™, manufactured by Rigaku Corporation) is used, a sample dish made of aluminum is used, and $\alpha$-$Al_2O_3$ powder is used as a reference sample. About 20 mg to 26 mg of a measurement sample is used, and the temperature is raised at 10° C./min or so from room temperature to 400° C. under Ar gas atmosphere.

According to the present invention, the difference between $T_{cx}$ and $T_{c1}$ is enhanced by adding LiBr. Although it is not necessarily clear, the mechanism involved thereto is assumed as follows: as part of the I is replaced with Br having a smaller ionic radius, it becomes difficult to have a good match with the crystal structure of a low Li ion conducting phase.

The value of $T_{cx}-T_{c1}$ is preferably 60° C. or higher, and more preferably 70° C. or higher. The value of $T_{cx}$ is, although it may vary depending on the composition, preferably 230° C. or higher, and more preferably 260° C. or higher. Furthermore, the value of $T_{c1}$ is generally 170° C. to 200° C. or so. Furthermore, in the present invention, the peak of $T_{c1}$ and the peak of $T_{cx}$ are not generally overlapped with each other. Specifically, the temperature at peak top on the high temperature side of $T_{c1}$ is sufficiently apart from the temperature at peak top on the low temperature side of $T_{cx}$. Specifically, the difference between them is preferably 40° C. or higher, and more preferably 50° C. or higher.

Furthermore, like Reference Examples that are described below, there can be a case where the exothermic peak of $T_{cx}$ is overlapped with other large exothermic peak, which is considered to be an exothermic peak of other crystal phase, specifically crystal phase of $\beta$-$Li_3PS_4$. In the present invention, temperature of the exothermic peak of the crystal phase of $\beta$-$Li_3PS_4$ may be referred to as $T_{c2}$. In the present invention, when the exothermic peak of $T_{cx}$ is overlapped with the exothermic peak of $T_{c2}$, $T_{c2}$ can be approximately used as $T_{cx}$. In that case, the value of $T_{cx}-T_{c1}$ can be approximated to the value of $T_{c2}-T_{c1}$, for example.

Furthermore, as a method for amorphization of a raw material composition, a mechanical milling and a melt quenching method can be mentioned. Among them, the mechanical milling is preferable in that the production process can be simplified as the treatment can be performed at room temperature. Furthermore, while the melt quenching method is limited in terms of reaction atmosphere or reaction vessel, the mechanical milling has an advantage that a sulfide glass with desired composition can be conveniently synthesized. The mechanical milling can be either a dry mechanical milling or a wet mechanical milling, but the latter is preferable, because adhesion of a raw material composition on a wall surface of a vessel or the like is prevented so that a sulfide glass with even higher amorphous nature can be obtained.

The mechanical milling is not particularly limited if the raw material composition is mixed with application of mechanical energy. Examples thereof include a ball mill, a vibrating mill, a turbo mill, a mechanofusion, and a disc mill. Among them, it is preferably a ball mill, and a planetary ball mill is particularly preferable because a desired sulfide glass can be efficiently obtained.

Furthermore, various conditions for the mechanical milling are set to have a desired sulfide glass. For example, when a planetary ball mill is used, a raw material composition and crusher balls are added to a vessel and the treatment is performed at a predetermined revolution number and time. In general, the production rate of a sulfide glass increases as the revolution number increases, and the conversion rate from the raw material composition to a sulfide glass increases as the treatment time increases. As for the revolution number of a large tray for running a planetary ball mill, it is in the range of 200 rpm to 500 rpm, and particularly preferably in the range of 250 rpm to 400 rpm. Furthermore, as for the treatment time for running a planetary ball mill, it is in the range of 1 hour to 100 hours, and particularly in the range of 1 hour to 50 hours. Furthermore, as for the material of a vessel used for a ball mill and crusher balls, $ZrO_2$ and $Al_2O_3$ can be mentioned, for example. Furthermore, the diameter of a crusher ball is in the range of 1 mm to 20 mm, for example.

With regard to a liquid used for a wet mechanical milling, a liquid not having a property of generating hydrogen sulfide upon reaction with the raw material composition is preferable. Hydrogen sulfide is generated as the protons disassociated from a liquid molecule react with the raw material composition or sulfide glass. For such reasons, it is preferable that the liquid has an aprotic property to the extent that it does not generate any hydrogen sulfide. Furthermore, the aprotic liquid can be generally classified into a polar aprotic liquid and a non-polar aprotic liquid.

Examples of the a polar aprotic liquid include, although not particularly limited, ketones such as acetone; nitriles such as acetonitrile; amide such as N,N-dimethyl formamide (DMF); and sulfoxides such as dimethyl sulfoxide (DMSO).

Examples of the non-polar aprotic liquid include an alkane which is present as a liquid at room temperature (25° C.). The alkane may be either a chain type alkane or a cycle type alkane. The carbon atom number of the chain type alkane is preferably 5 or more, for example. The upper limit of the carbon atom number of the chain type alkane is not particularly limited, if it is present as a liquid at room temperature. Specific examples of the chain type alkane include pentane, hexane, heptane, octane, nonane, decane, undecane, dodecane, and paraffin. Incidentally, the chain type alkane may also have a branch. Meanwhile, specific examples of the cycle type alkane include cyclopentane, cyclohexane, cycloheptane, cyclooctane, and cycloparaffin.

Furthermore, other examples of the non-polar aprotic liquid include aromatic hydrocarbons such as benzene, toluene, and xylene; chain type ethers such as diethyl ether and dimethyl ether; cyclic ethers such as tetrahydrofuran; halogenated alkyls such as chloroform, methyl chloride, and methylene chloride; esters such as ethyl acetate; and fluorine-based compounds such as fluorobenzene, fluoroheptane, 2,3-dihydroperfluoropentane, and 1,1,2,2,3,3,4-heptafluorocyclopentane. Incidentally, the addition amount of the liquid is not particularly limited, and it can be an amount which allows obtainment of a desired sulfide solid electrolyte material.

2. Heat Treatment Step

Next, the heat treatment step of the present invention is described. In the present invention, the heat treatment step is a step of heating the sulfide glass at a temperature of 195° C. or higher.

The heat treatment temperature for the heat treatment step is generally 195° C. or higher. In particular, the heat treatment temperature is preferably 200° C. or higher, and more preferably 205° C. or higher. Meanwhile, although it is not particularly limited, the upper limit of the heat treatment temperature can be $(T_{cx}-50)°$ C., for example.

Incidentally, although it is not particularly limited if it is the time allowing the obtainment of a desired glass ceramics, the heat treatment time is in the range of 1 minute to 24 hours, for example. In particular, it is preferably in the range of 1 minute to 10 hours. Furthermore, it is preferable that the heat treatment is performed in an inert gas atmosphere (for example, Ar gas atmosphere) or in a reduced pressure atmosphere (in particular, vacuum), because the deterioration of the sulfide solid electrolyte (for example, oxidation) can be prevented. Although it is not particularly limited, examples of the heat treatment method include a method of using a calcination furnace.

3. Sulfide Solid Electrolyte Material

Next, the sulfide solid electrolyte material that is obtained by the present invention is described. The sulfide solid electrolyte material obtained by the present invention contains Li, P, I, Br, and S. The type of elements constituting the sulfide solid electrolyte material can be determined by ICP spectrophotometry analyzer, for example.

Furthermore, the sulfide solid electrolyte material obtained by the present invention has peaks at $2\theta=20.2°$ and $2\theta=23.6°$ in an X ray diffraction measurement using a CuKα ray. Those peaks are the peak of a crystal phase with high Li ion conductivity. Incidentally, the crystal phase may be referred to as a high Li ion conducting phase. As described herein, the peak at $2\theta=20.2°$ indicates not only the peak precisely at $2\theta=20.2°$ but also a peak in the range of $2\theta=20.2°\pm0.5°$. It is defined like that since the peak position may be slightly different depending on the state of a crystal. Similarly, the peak at $2\theta=23.6°$ indicates not only the peak precisely at $2\theta=23.6°$ but also a peak in the range of with $2\theta=23.6°\pm0.5°$. Furthermore, the high Li ion conducting phase generally has peaks at $2\theta=29.4°$, $37.8°$, $41.1°$, and $47.0°$, in addition to $2\theta=20.2°$ and $23.6°$. Those peak positions may also be slightly different within the range of $\pm0.5°$. Furthermore, in particular, the sulfide solid electrolyte material has only the peak of a high Li ion conducting phase, that is, it has a single phase of a high Li ion conducting phase, because a sulfide solid electrolyte material having high Li ion conductivity can be provided accordingly.

Furthermore, it is preferable that the sulfide solid electrolyte material obtained by the present invention does not have peaks at $2\theta=21.0°$ and $28.0°$ in an X ray diffraction measurement using a CuKα ray. The crystal phase having those peaks relates to a peak of a crystal phase which has lower Li ion conductivity than the high Li ion conducting phase. Incidentally, this crystal phase may be referred to as a low Li ion conducting phase. As described herein, the peak at $2\theta=21.0°$ indicates not only the peak precisely at $2\theta=21.0°$ but also a peak in the range of $2\theta=21.0°\pm0.5°$. It is defined like that since the peak position may be slightly different depending on the state of a crystal. Similarly, the peak at $2\theta=28.0°$ indicates not only the peak precisely at $2\theta=28.0°$ but also a peak in the range of with $2\theta=28.0°\pm05°$ Furthermore, the low Li ion conducting phase generally has peaks at $2\theta=32.0°$, $33.4°$, $38.7°$, $42.8°$, and $44.2°$, in addition to $2\theta=21.0°$ and $28.0°$. Those peak positions may also be slightly different within the range of $\pm0.5°$.

Furthermore, the expression "has no peaks at $2\theta=21.0°$ and $28.0°$" described in the present invention indicates that no peak is determined at $2\theta=21.0°$ and $28.0°$, or the peak intensity at $2\theta=20.2°$ relative to the peak intensity at $2\theta=21.0°$, that is, $I_{20.2}/I_{21.0}$, is 2.5 or more. $I_{20.2}/I_{21.0}$ is preferably 5 or more, and more preferably 10 or more. Meanwhile, $I_{21.0}/I_{20.2}$ is preferably 0.4 or less, preferably 0.2 or less, and more preferably 0.1 or less. Incidentally, $I_{21.0}/I_{20.2}$ has an inverse relationship with $I_{20.2}/I_{21.0}$.

Furthermore, the sulfide solid electrolyte material obtained by the present invention preferably has a small half width of the peak at $2\theta=20.2°$, which corresponds to the peak of a high Li ion conducting phase. The half width is preferably 0.51° or less, preferably 0.50° or less, more preferably 0.45° or less, even more preferably 0.44° or less, and particularly preferably 0.43° or less. As described herein, the half width means full width half maximum (FWHM) of the peak at $2\theta=20.2°$.

The sulfide solid electrolyte material obtained by the present invention is generally glass ceramics. The glass ceramics indicates a material obtained by crystallization of sulfide glass. The glass ceramics can be confirmed by X ray diffraction, for example. Furthermore, the sulfide glass indicates a material synthesized by amorphization of a raw material composition, and it indicates not only the "glass" that is not observed with any periodic feature of a crystal according to X ray diffraction in the strict sense but also any material that is synthesized by amorphization based on mechanical milling or the like that is described below. For such reasons, even when a peak derived from the raw material (LiI or the like) is observed by X ray diffraction measurement or the like, it can be a sulfide glass if it is synthesized by amorphization.

Furthermore, the sulfide solid electrolyte material obtained by the present invention is preferably constituted from an ion conductor having Li, P, and S; LiI; and LiBr. At least part of LiI and LiBr is normally present as, each as a LiI component and LiBr component, being introduced to a structure of an ion conductor. Furthermore, the sulfide solid electrolyte material obtained by the present invention may or may not have a LiI peak according to X ray diffraction measurement. However, it preferably has a LiI peak, because Li ion conductivity is high. The same applies to LiBr.

According to the present invention, the ion conductor has Li, P, and S. The ion conductor is not particularly limited if it has Li, P, and S. However, it is preferably an ion conductor having an ortho-composition, because a sulfide solid electrolyte material with high chemical stability can be provided. As described herein, the ortho generally means, among oxo acids that are obtained by hydration of same oxides, the oxo acid having the highest hydration level. In the present invention, the crystal composition having $Li_2S$ added most to a sulfide is referred to as an ortho-composition. For example, in the $Li_2S$—$P_2S_5$ system, $Li_3PS_4$ corresponds to the ortho-composition. Incidentally, in case of $Li_2S$—$P_2S_5$-based sulfide solid electrolyte material, the ratio of $Li_2S$ and $P_2S_5$ for obtaining the ortho-composition is, in terms of molar base, $Li_2S:P_2S_5=75:25$.

Furthermore, as described herein, the expression "has an ortho-composition" means not only the ortho-composition in the strict sense but also a composition close to it. Specifically, it indicates a composition in which an anion structure ($PS_4^{3-}$ structure) of an ortho-composition is included as a main component. The ratio of the anion structure of an ortho-composition is preferably 60 mol % or more, more preferably 70 mol % or more, even more preferably 80 mol % or more, and particularly preferably 90 mol % or more, relative to the entire anion structure of an ion conductor. Incidentally, the ratio of the anion structure of an ortho-composition can be determined by Raman spectroscopy, NMR, XPS, or the like.

Furthermore, it is preferable that the sulfide solid electrolyte material obtained by the present invention substantially contains no $Li_2S$, because a sulfide solid electrolyte material with less production amount of hydrogen sulfide can be provided. As $Li_2S$ reacts with water, hydrogen sulfide is produced. For example, when the ratio of $Li_2S$ contained in the raw material composition is high, it is easy to have residual $Li_2S$. "Substantially contains no $Li_2S$" can be confirmed by X ray diffraction. Specifically, when there is no peak of $Li_2S$ ($2\theta=27.0°$, $31.2°$, $44.8°$, and $53.1°$), it can be determined that $Li_2S$ is not substantially contained.

Furthermore, it is preferable that the sulfide solid electrolyte material obtained by the present invention substantially contains no cross-linking sulfur, because a sulfide solid electrolyte material with less production amount of hydrogen sulfide can be provided. The term "cross-linking sulfur" means cross-linking sulfur in a compound that is obtained by a reaction between $Li_2S$ and $P_2S_5$. For example, it is cross-linking sulfur with $S_3P$—S—$PS_3$ structure which is obtained by reaction between $Li_2S$ and $P_2S_5$. Such cross-linking sulfur easily reacts with water so that hydrogen sulfide can be easily produced. When the ratio of $Li_2S$ contained in the raw material composition is low, the cross-linking sulfur may be easily produced. "Substantially contains no cross-linking sulfur" can be confirmed by measurement of Raman spectrophotometric spectrum. For example, in case of a $Li_2S$—$P_2S_5$-based sulfide solid electrolyte material, the peak of $S_3P$—S—$PS_3$ structure generally appears at 402 $cm^{-1}$. For such reasons, it is preferable that this peak is not detected. Furthermore, the peak of $PS_4^{3-}$ structure generally appears at 417 $cm^{-1}$. In the present invention the intensity at 402 $cm^{-1}$, that is, $I_{402}$, is preferably smaller than the intensity at 417 $cm^{-1}$, that is, $I_{417}$. Specifically, the intensity $I_{402}$ relative to the intensity $I_{417}$ is preferably 70% or less, for example. It is more preferably 50% or less, and even more preferably 35% or less.

Examples of the shape of the sulfide solid electrolyte material which is obtained by the present invention include a particulate shape. The average particle diameter ($D_{50}$) of a particulate sulfide solid electrolyte material is preferably in the range of 0.1 μm to 50 μm. Moreover, the Li ion conductivity of the sulfide solid electrolyte material is preferably high. The Li ion conductivity at room temperature is preferably $1\times10^{-4}$ S/cm or more, and more preferably $1\times10^{-3}$ S/cm or more.

The sulfide solid electrolyte material obtained by the present invention can be used for any application in which the Li ion conductivity is required. In particular, the sulfide solid electrolyte material is preferably used for a battery. Furthermore, according to the present invention, a method for producing a lithium solid state battery characterized by using the aforementioned sulfide solid electrolyte material can be provided. The sulfide solid electrolyte material can be used for a cathode active material layer, an anode active material layer, or a solid electrolyte layer.

Furthermore, the present invention can also provide the aforementioned sulfide solid electrolyte material, that is, a sulfide solid electrolyte material that contains Li, P, I, Br, and S, and has, in an X ray diffraction measurement using a CuKα ray, peaks at $2\theta=20.2°$ and $2\theta=23.6°$ and does not have peaks at $2\theta=21.0°$ and $28.0°$, in which the half width of the peak at $2\theta=20.2°$ is within the aforementioned range.

Incidentally, the present invention is not limited to the above-mentioned embodiments. The above-mentioned embodiments are just an exemplification, and any is included in the technical scope of the present invention if it has substantially the same constitution as the technical idea described in the claims of the present invention and exhibits the same working effects as the present invention.

EXAMPLES

Hereinbelow, the present invention is more specifically described by way of Examples. Incidentally, unless specifically described otherwise, each operation such as weighing, synthesis, or drying is performed under Ar atmosphere.

Reference Example 1-1

Used as a starting material were $Li_2S$ (manufactured by Nippon Chemical Industrial Co., Ltd.), $P_2S_5$ (manufactured by Sigma-Aldrich Co. LLC.) and LiI (manufactured by NIPPOH CHEMICALS CO., LTD.). Weighed were 0.558 g of $Li_2S$, 0.900 g of $P_2S_5$, and 0.542 g of LiI and they were admixed with each other for 5 minutes using an agate mortar. The mixture was added to a vessel of a planetary ball mill (45 cc, made of $ZrO_2$), and after adding dehydrated heptane (moisture amount of 30 ppm or less, 4 g) and additionally adding $ZrO_2$ ball (ϕ=5 mm, 53 g), the vessel was completely sealed. The vessel was mounted on a planetary ball milling machine (P7™ manufactured by Fritsch Japan Co., Ltd.) to perform mechanical milling for 20 hours at the number of weighing table revolutions of 500 rpm. Thereafter, it was dried for 1 hour at 110° C. to remove heptane, thereby obtaining a sulfide glass. Incidentally, the composition is 20LiI.80 ($0.75Li_2S. 0.25P_2S_5$) in terms of molar expression, and this composition is designated as composition A.

Reference Example 1-2

A sulfide glass was obtained in the same manner as Reference Example 1-1 except that, 0.572 g of $Li_2S$, 0.922 g of $P_2S_5$, 0.416 g of LiI, and 0.09 g of LiBr were used such that $Li_2S$ (manufactured by NIPPOH CHEMICALS CO., LTD.), $P_2S_5$ (manufactured by Sigma-Aldrich Co. LLC), LiI (manufactured by NIPPOH CHEMICALS CO., LTD.) and LiBr (manufactured by Kojundo Chemical Lab. Co., Ltd.) were used as starting materials. Incidentally, the composition is 15LiI.5 LiBr.80 ($0.75Li_2S.0.25P_2S_5$) in terms of molar expression, and this composition is designated as composition B.

Reference Example 1-3

A sulfide glass was obtained in the same manner as Reference Example 1-1 except that, 0.580 g of $Li_2S$, 0.936 g of $P_2S_5$, 0.338 g of LiI, and 0.146 g of LiBr were used such that $Li_2S$ (manufactured by NIPPOH CHEMICALS CO., LTD.), $P_2S_5$ (manufactured by Sigma-Aldrich Co. LLC), LiI (manufactured by NIPPOH CHEMICALS CO., LTD.) and LiBr (manufactured by Kojundo Chemical Lab. Co., Ltd.) were used as starting materials. Incidentally, the composition is 12LiI.8LiBr.80 ($0.75Li_2S.0.25P_2S_5$) in terms of molar expression, and this composition is designated as composition C.

Reference Example 1-4

First, a sulfide glass was obtained in the same manner as Reference Example 1-1. Next, 0.5 g of the obtained sulfide glass was sealed in a quartz tube under vacuum and then subjected to a heat treatment at 170° C. Specifically, the sample was added to a furnace which has been previously maintained at 170° C. and subjected to a heat treatment for 3 hours to obtain a sulfide solid electrolyte material as glass ceramics.

Reference Example 1-5

A sulfide solid electrolyte material was obtained in the same manner as Reference Example 1-4 except that the heat treatment temperature was changed to 180° C.

Reference Example 1-6

A sulfide solid electrolyte material was obtained in the same manner as Reference Example 1-4 except that the heat treatment temperature was changed to 190° C.

Reference Example 1-7

A sulfide solid electrolyte material was obtained in the same manner as Reference Example 1-4 except that the heat treatment temperature was changed to 200° C.

[Evaluation 1]
(DTA Measurement)

DTA analysis was performed for the sulfide glass with the compositions A to C. For the measurement, a TG-DTA apparatus (Thermo plus EVO™, manufactured by Rigaku Corporation) was used. An aluminum sample dish was used and $\alpha$-$Al_2O_3$ powder was used as a reference sample. The measurement sample was used in an amount of 20 mg to 26 mg, and after raising the temperature from room temperature to 400° C. at 10° C./min under Ar gas atmosphere, the DTA analysis was performed. Incidentally, peak values of an exothermic peak were read in the present invention. The results are shown in FIG. 2 and Table 1.

TABLE 1

| Composition | Tc1 (° C.) | Tcx (° C.) | Tc2 (° C.) | (Tcx or Tc2) − Tc1 (° C.) |
|---|---|---|---|---|
| A | 191 | 243 | 328 | 52 |
| B | 190 | 263 | 290 | 73 |
| C | 190 | — | 273 | 83 |

Figure 2:
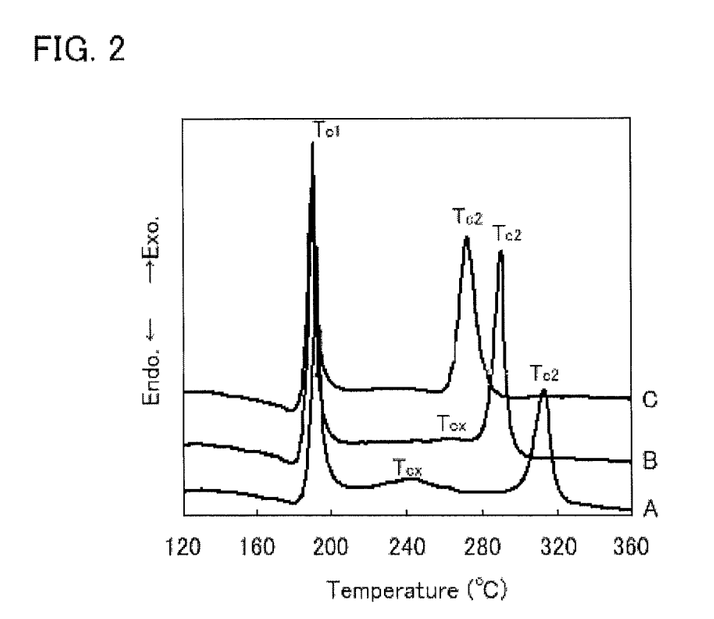
FIG. 2 shows a result of DTA analysis of the sulfide glass with compositions A to C.

As shown in FIG. 2 and Table 1, $T_{c1}$ of the sulfide glass with the compositions A to C was near 190° C. Meanwhile, when the composition A is compared to the composition B, it was able to confirm that the $T_{cx}$ is shifted to a high temperature side in the composition B. Furthermore, it is considered that the exothermic peak of $T_{cx}$ and the exothermic peak of $T_{c2}$ are overlapped with each other in the composition C.

(Measurement of Li Ion Conductivity)

Figure 3:
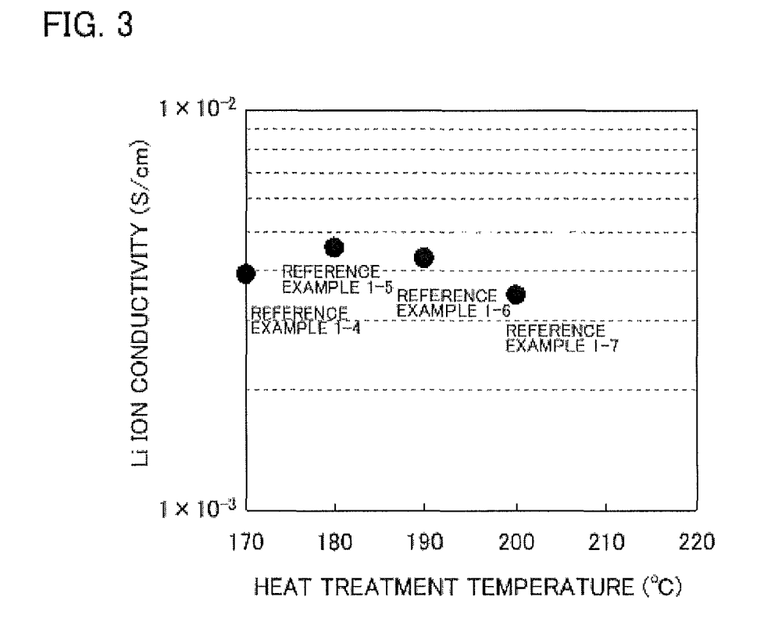
FIG. 3 shows a result of Li ion conductivity measurement of the sulfide solid electrolyte materials obtained from Reference Examples 1-4 to 1-7.

Measurement of Li ion conductivity was performed for the sulfide solid electrolyte materials obtained from Reference Examples 1-4 to 1-7. First, the sample was cold-pressed under pressure of 4 ton/cm² to yield a pellet with $\phi$ of 11.29 mm and thickness of about 500 μm. Next, the pellet was added to a vessel filled with Ar gas to have an inert atmosphere followed by measurement. For the measurement, Solartron (SI1260™, manufactured by TOYO Corporation) was used. Furthermore, the measurement temperature was adjusted to 25° C. by using a constant-temperature bath. The results are shown in FIG. 3. As shown in FIG. 3, in Reference Examples 1-4 to 1-7, the Li ion conductivity decreased when the heat treatment temperature is higher than 180° C.

(X Ray Diffraction Measurement)

Figure 4:
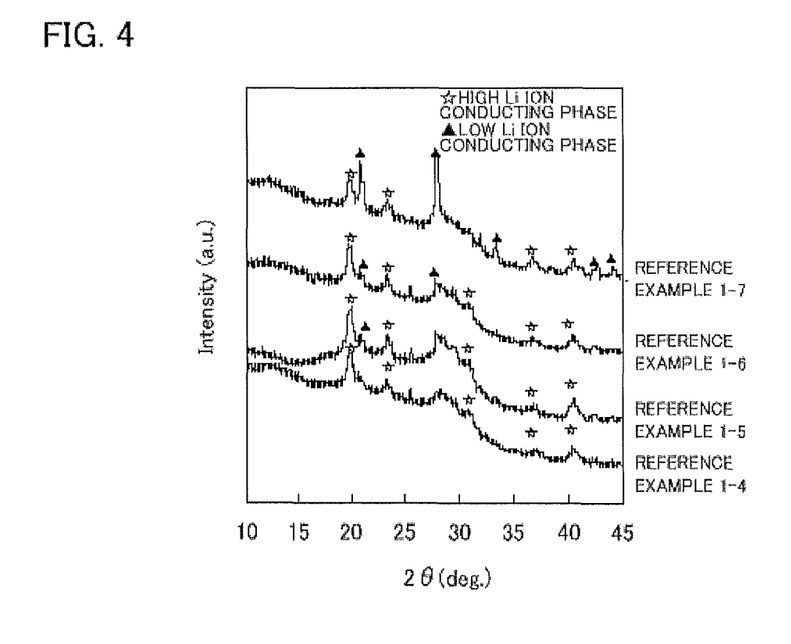
FIG. 4 shows a result of X ray diffraction measurement of the sulfide solid electrolyte materials obtained from Reference Examples 1-4 to 1-7.

X ray diffraction measurement was performed for the sulfide solid electrolyte materials obtained from Reference Examples 1-4 to 1-7. Namely, by using an XRD apparatus (RINT-UltimaIII™) manufactured by Rigaku Corporation, powder XRD measurement was performed. The sample was applied on a jig with a dome shape, and the measurement was performed in the range of 2θ=10° to 60° under inert atmosphere of Ar gas. The scanning speed was 5°/min, and the sampling width was 0.02°. The results are shown in FIG. 4. As shown in FIG. 4, the peak of low Li ion conducting phase increased in accordance with an increase in the heat treatment temperature.

Reference Example 2-1

First, a sulfide glass was obtained in the same manner as Reference Example 1-1. Next, 0.5 g of the obtained sulfide glass was sealed in a quartz tube under vacuum and then subjected to a heat treatment at 185° C. Specifically, the sample was added to a furnace which has been previously maintained at 185° C. and subjected to a heat treatment for 3 hours to obtain a sulfide solid electrolyte material as glass ceramics.

Reference Examples 2-2 to 2-8

A sulfide solid electrolyte material was obtained in the same manner as Reference Example 2-1 except that "x" in (20−x)LiI.xLiBr.80 (0.75$Li_2S$.0.25$P_2S_5$) was changed to 1, 3, 5, 8, 10, 15, 20. Incidentally, for each composition, the LiBr/(LiI+LiBr) was 5 mol %, 15 mol %, 25 mol %, 40 mol %, 50 mol %, 75 mol %, and 100 mol %, respectively.

Comparative Example 1-1

A sulfide solid electrolyte material was obtained in the same manner as Reference Example 2-1 except that the heat treatment temperature was changed to 195° C.

Examples 1-1 to 1-6, Comparative Example 1-2

A sulfide solid electrolyte material was obtained in the same manner as Comparative Example 1-1 except that "x" in (20−x)LiI.xLiBr.80 (0.75$Li_2S$.0.25$P_2S_5$) was changed to 1, 3, 5, 8, 10, 15, 20. Incidentally, for each composition, the LiBr/(LiI+LiBr) was 5 mol %, 15 mol %, 25 mol %, 40 mol %, 50 mol %, 75 mol %, and 100 mol %, respectively.

Comparative Example 2-1

A sulfide solid electrolyte material was obtained in the same manner as Reference Example 2-1 except that the heat treatment temperature was changed to 205° C.

Examples 2-1 to 2-6

A sulfide solid electrolyte material was obtained in the same manner as Comparative Example 2-1 except that "x" in (20−x)LiI.xLiBr.80 (0.75$Li_2S$.0.25$P_2S_5$) was changed to 1, 3, 5, 8, 10, 15. Incidentally, for each composition, the LiBr/(LiI+LiBr) was 5 mol %, 15 mol %, 25 mol %, 40 mol %, 50 mol %, and 75 mol %, respectively.

[Evaluation 2]
(Measurement of Li Ion Conductivity)

Measurement of Li ion conductivity was performed for the sulfide solid electrolyte materials obtained from Reference Examples 2-1 to 2-8, Comparative Examples 1-1 and 1-2, Examples 1-1 to 1-6, Comparative Example 2-1, and Examples 2-1 to 2-6. The measurement conditions are as defined above. The results are shown in FIG. 5 to FIG. 7 and Table 2 to Table 4.

Figure 5:
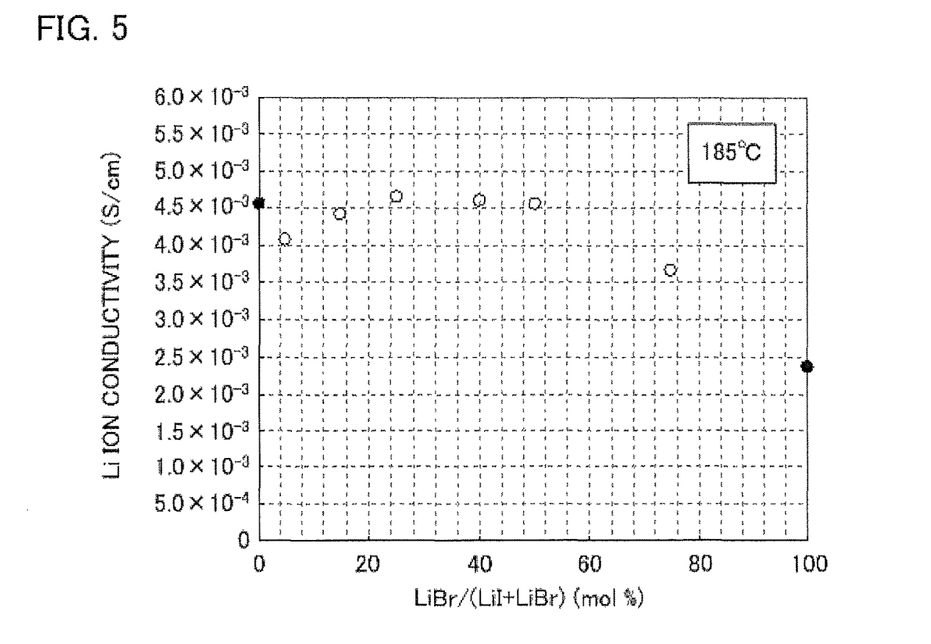
FIG. 5 shows a result of Li ion conductivity measurement of the sulfide solid electrolyte materials obtained from Reference Examples 2-1 to 2-8.

First, among Reference Examples 2-1 to 2-8 as shown in FIG. 5 and Table 2, Reference Examples 2-3 to 2-7 exhibited higher Li ion conductivity than the linear Li ion conductivity which connects the Reference Example 2-1 (LiBr 0 mol %) and Reference Example 2-8 (LiBr 100 mol %). Accordingly, it was confirmed that the Li ion conductivity is improved as part of LiI is replaced with LiBr. Meanwhile, among Reference Examples 2-2 to 2-7, Reference Example 2-4 exhibited the highest Li ion conductivity. However, the Li ion conductivity of Reference Example 2-4 was almost the same as the Li ion conductivity of Reference Example 2-1.

Figure 6:
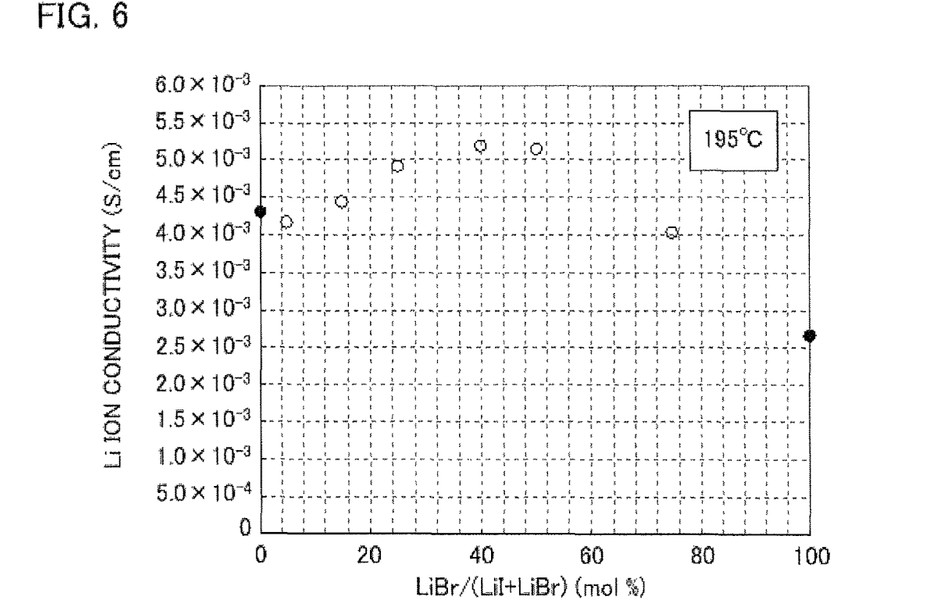
FIG. 6 shows a result of Li ion conductivity measurement of the sulfide solid electrolyte materials obtained from Comparative Examples 1-1 and 1-2 and Examples 1-1 to 1-6.

Next, as shown in FIG. 6 and Table 3, Examples 1-1 to 1-6 exhibited the Li ion conductivity which is equal to or higher than that of Comparative Example 1-1. Incidentally, in Comparative Example 1-1 (heat treatment temperature 195° C.), the Li ion conductivity was decreased compared to the above-mentioned Reference Example 2-1 (heat treatment temperature 185° C.). It is considered that the decrease is caused by production of a large amount of a low Li ion conducting phase as the heat treatment temperature increased.

Figure 7:
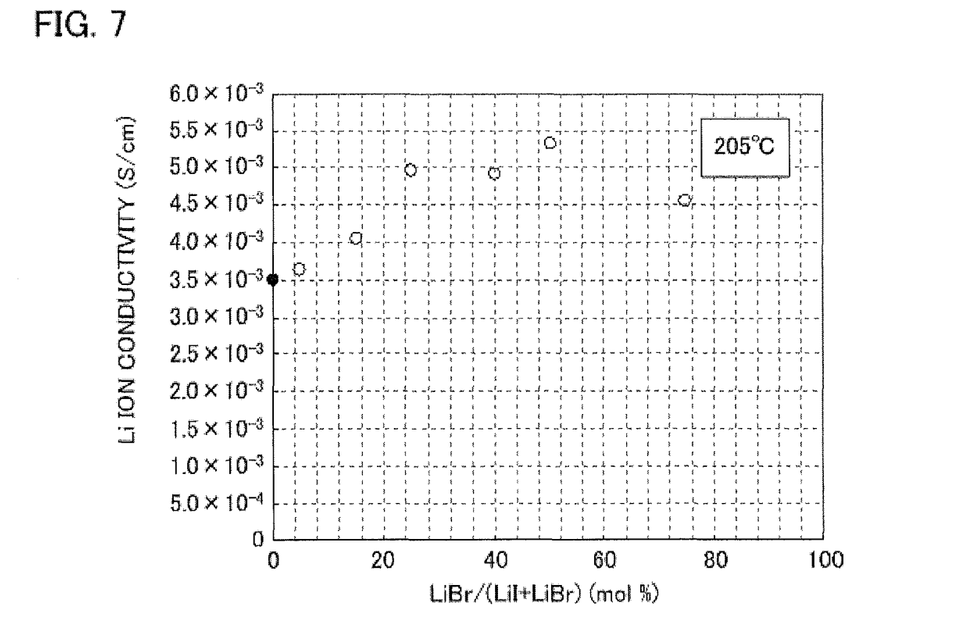
FIG. 7 shows a result of Li ion conductivity measurement of the sulfide solid electrolyte materials obtained from Comparative Example 2-1 and Examples 2-1 to 2-6.

Next, as shown in FIG. 7 and Table 4, Examples 2-1 to 2-6 exhibited the Li ion conductivity higher than that of Comparative Example 2-1. Incidentally, in Comparative Example 2-1 (heat treatment temperature 205° C.), the Li ion conductivity was significantly decreased compared to the above-mentioned Reference Example 2-1 (heat treatment temperature 185° C.). It is also considered that the decrease is caused by production of a large amount of a low Li ion conducting phase as the heat treatment temperature increased.

(X Ray Diffraction Measurement)

X ray diffraction measurement was performed for the sulfide solid electrolyte materials obtained from Reference Examples 2-1 to 2-8, Comparative Examples 1-1 and 1-2, Examples 1-1 to 1-6, Comparative Example 2-1, and Examples 2-1 to 2-6. The measurement conditions are as defined above.

TABLE 2

|  | Heat Treatment Temperature (° C.) | LiBr/(LiI + LiBr) (mol %) | Li ion Conductivity (S/cm) | $I_{20.2}/I_{21.0}$ | Half Width (°) |
| --- | --- | --- | --- | --- | --- |
| Reference Example 2-1 | 185 | 0 | $4.5 \times 10^{-3}$ | 2.1 | 0.511 |
| Reference Example 2-2 |  | 5 | $4.1 \times 10^{-3}$ | 1.8 | 0.521 |
| Reference Example 2-3 |  | 15 | $4.4 \times 10^{-3}$ | 2.2 | 0.480 |
| Reference Example 2-4 |  | 25 | $4.7 \times 10^{-3}$ | 2.8 | 0.473 |
| Reference Example 2-5 |  | 40 | $4.6 \times 10^{-3}$ | — | 0.502 |
| Reference Example 2-6 |  | 50 | $4.6 \times 10^{-3}$ | — | 0.539 |
| Reference Example 2-7 |  | 75 | $3.7 \times 10^{-3}$ | — | 0.543 |
| Reference Example 2-8 |  | 100 | $2.4 \times 10^{-3}$ | — | 0.540 |

TABLE 3

|  | Heat Treatment Temperature (° C.) | LiBr/(LiI + LiBr) (mol %) | Li ion Conductivity (S/cm) | $I_{20.2}/I_{21.0}$ | Half Width (°) |
| --- | --- | --- | --- | --- | --- |
| Comparative Example 1-1 | 195 | 0 | $4.3 \times 10^{-3}$ | 2 | 0.510 |
| Example 1-1 |  | 5 | $4.2 \times 10^{-3}$ | 1.3 | 0.520 |
| Example 1-2 |  | 15 | $4.4 \times 10^{-3}$ | 1.7 | 0.501 |
| Example 1-3 |  | 25 | $4.9 \times 10^{-3}$ | — | 0.431 |
| Example 1-4 |  | 40 | $5.2 \times 10^{-3}$ | — | 0.437 |
| Example 1-5 |  | 50 | $5.1 \times 10^{-3}$ | — | 0.447 |
| Example 1-6 |  | 75 | $4.0 \times 10^{-3}$ | — | 0.510 |
| Comparative Example 1-2 |  | 100 | $2.7 \times 10^{-3}$ | — | 0.546 |

TABLE 4

|  | Heat Treatment Temperature (° C.) | LiBr/(LiI + LiBr) (mol %) | Li ion Conductivity (S/cm) | $I_{20.2}/I_{21.0}$ | Half Width (°) |
| --- | --- | --- | --- | --- | --- |
| Comparative Example 2-1 | 205 | 0 | $3.5 \times 10^{-3}$ | 0.54 | 0.488 |

TABLE 4-continued

|  | Heat Treatment Temperature (° C.) | LiBr/(LiI + LiBr) (mol %) | Li ion Conductivity (S/cm) | $I_{20.2}/I_{21.0}$ | Half Width (°) |
|---|---|---|---|---|---|
| Example 2-1 |  | 5 | $3.6 \times 10^{-3}$ | 0.55 | 0.510 |
| Example 2-2 |  | 15 | $4.0 \times 10^{-3}$ | 0.58 | 0.470 |
| Example 2-3 |  | 25 | $4.9 \times 10^{-3}$ | 1.2 | 0.451 |
| Example 2-4 |  | 40 | $4.9 \times 10^{-3}$ | — | 0.419 |
| Example 2-5 |  | 50 | $5.3 \times 10^{-3}$ | — | 0.420 |
| Example 2-6 |  | 75 | $4.5 \times 10^{-3}$ | — | 0.495 |

Figure 8:
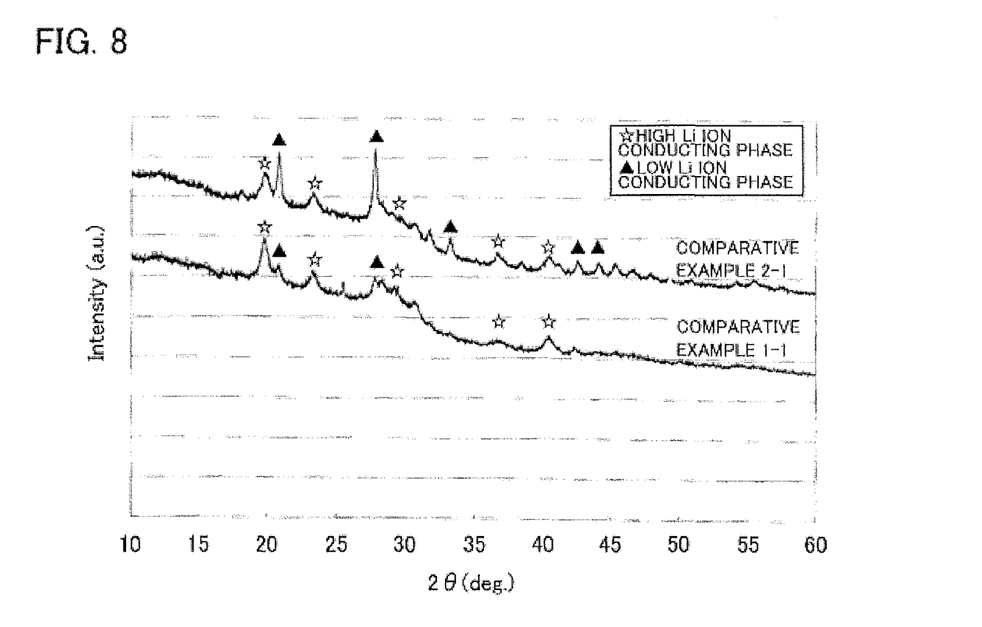
FIG. 8 shows a result of X ray diffraction measurement of the sulfide solid electrolyte materials obtained from Comparative Example 1-1 and Comparative Example 2-1.
Figure 9A:
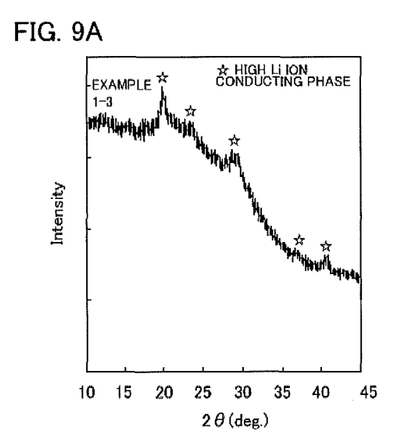
FIGS. 9A and 9B show results of X ray diffraction measurement of the sulfide solid electrolyte materials obtained from Example 1-3 and 1-4 and Example 2-4.
Figure 9B:
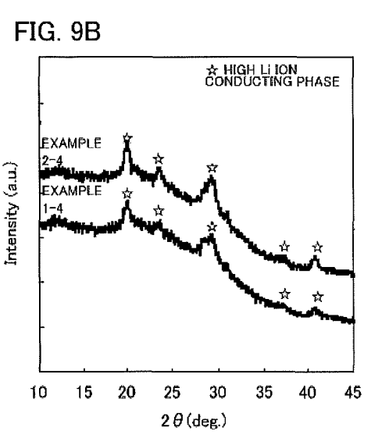

As shown in FIG. 8, FIGS. 9A and 9B, and Table 2 to Table 4, Examples exhibited a small ratio of the low Li ion conducting phase but high crystallinity of the high Li ion conducting phase. Incidentally, in Example 1 according to JP-A No. 2013-016423, no peak of a low Li ion conducting phase is shown. However, the Li ion conductivity was as low as $2.9 \times 10^{-3}$ S/cm. Furthermore, as a result of measuring the half width, it was found to be 0.56°.

Example 3-1

A sulfide glass was obtained in the same manner as Reference Example 1-1 except that, 0.622 g of $Li_2S$, 1.002 g of $P_2S_5$, 0.284 g of LiI, and 0.092 g of LiBr were used such that $Li_2S$ (manufactured by Nippon Chemical Industrial Co., Ltd.), $P_2S_5$ (manufactured by Sigma-Aldrich Co. LLC.), LiI (manufactured by NIPPOH CHEMICALS CO., LTD.), and LiBr (manufactured by Kojundo Chemical Lab. Co., Ltd.) were used as starting materials. Next, 0.5 g of the obtained sulfide glass was sealed in a quartz tube under vacuum and then subjected to a heat treatment at 195° C., 205° C., 215° C., or 225° C., respectively. Specifically, the sample was added to a furnace which has been previously maintained at a predetermined temperature and subjected to a heat treatment for 3 hours to obtain a sulfide solid electrolyte material as glass ceramics. Incidentally, the composition is 10LiI5LiBr.85 $(0.75Li_2S.0.25P_2S_5)$ in terms of molar expression.

Example 3-2

A sulfide solid electrolyte material was obtained in the same manner as Example 3-1 except that 0.637 g of $Li_2S$, 1.028 g of $P_2S_5$, 0.146 g of LiI, and 0.189 g of LiBr were used. Incidentally, the composition is 5LiI.10LiBr.85 $(0.75Li_2S.0.25P_2S_5)$ in terms of molar expression.

Example 3-3

A sulfide solid electrolyte material was obtained in the same manner as Example 3-1 except that 0.537 g of $Li_2S$, 0.866 g of $P_2S_5$, 0.417 g of LiI, and 0.180 g of LiBr were used. Incidentally, the composition is 15LiI.10LiBr.75 $(0.75Li_2S.0.25P_2S_5)$ in terms of molar expression.

Example 3-4

A sulfide solid electrolyte material was obtained in the same manner as Example 3-1 except that 0.490 g of $Li_2S$, 0.790 g of $P_2S_5$, 0.544 g of LiI, and 0.176 g of LiBr were used. Incidentally, the composition is 20LiI.10LiBr.70 $(0.75Li_2S.0.25P_2S_5)$ in terms of molar expression.

Example 3-5

A sulfide solid electrolyte material was obtained in the same manner as Example 3-1 except that 0.586 g of $Li_2S$, 0.9452 g of $P_2S_5$, 0.284 g of LiI, and 0.185 g of LiBr were used. Incidentally, the composition is 10LiI.10LiBr.80 $(0.75Li_2S.0.25P_2S_5)$ in terms of molar expression.

Example 3-6

A sulfide solid electrolyte material was obtained in the same manner as Example 3-1 except that 0.550 g of $Li_2S$, 0.887 g of $P_2S_5$, 0.285 g of LiI, and 0.277 g of LiBr were used. Incidentally, the composition is 10LiI.15LiBr.75 $(0.75Li_2S.0.25P_2S_5)$ in terms of molar expression.

Example 3-7

A sulfide solid electrolyte material was obtained in the same manner as Example 3-1 except that 0.514 g of $Li_2S$, 0.830 g of $P_2S_5$, 0.285 g of LiI, and 0.370 g of LiBr were used. Incidentally, the composition is 10LiI.20LiBr.70 $(0.75Li_2S.0.25P_2S_5)$ in terms of molar expression.

TABLE 5

|  | LiI Ratio (mol %) | LiBr Ratio (mol %) | $Li_3PS_4$ Ratio (mol %) |
|---|---|---|---|
| Example 3-1 | 10 | 5 | 85 |
| Example 3-2 | 5 | 10 | 85 |
| Example 3-3 | 15 | 10 | 75 |
| Example 3-4 | 20 | 10 | 70 |
| Example 3-5 | 10 | 10 | 80 |
| Example 3-6 | 10 | 15 | 75 |
| Example 3-7 | 10 | 20 | 70 |

(Measurement of Li Ion Conductivity)

Figure 10:
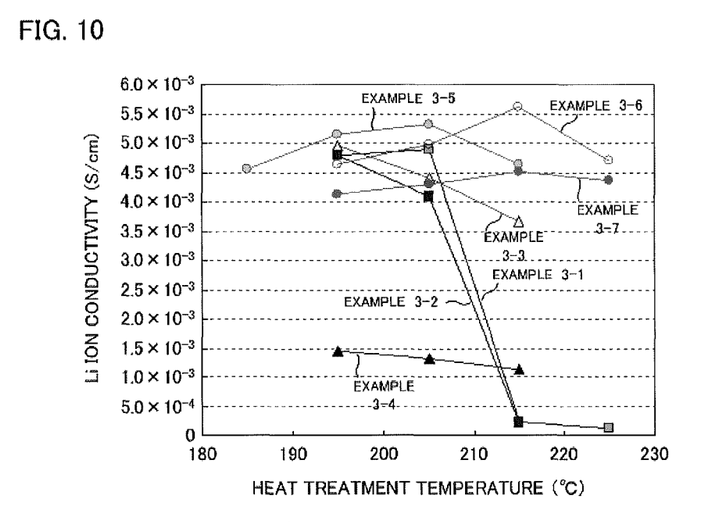
FIG. 10 shows a result of Li ion conductivity measurement of the sulfide solid electrolyte materials obtained from Examples 3-1 to 3-7.

Measurement of Li ion conductivity was performed for the sulfide solid electrolyte materials which have been obtained from Examples 3-1 to 3-7. The measurement conditions are as defined above. The results are shown in FIG. 10. As shown in FIG. 10, Examples 3-5 to 3-7 exhibited high Li ion conductivity even when the heat treatment temperature is high.

The invention claimed is:

1. A method for producing a sulfide solid electrolyte material that has peaks at 2θ=20.2° and 2θ=23.6° in an X ray diffraction measurement using a CuKα ray, the method comprising steps of:
    an amorphizing step of obtaining sulfide glass by amorphization of a raw material composition that contains at least $Li_2S$, $P_2S_5$, LiI and LiBr; and
    a heat treatment step of heating the sulfide glass at a temperature of 195° C. or higher, wherein
    a ratio of the LiBr relative to all the components in the raw material composition is equal to or more than 10 mol % and equal to or less than 20 mol %,
    a ratio of the LiBr relative to the total of the LiI and the LiBr in the raw material composition:

LiBr/(LiI+LiBr)

is in the range of 15 mol % to 50 mol %, and
a ratio of the $Li_2S$ relative to the total of the $Li_2S$ and the $P_2S_5$ in the raw material composition:

$$Li_2S/(Li_2S+P_2S_5)$$

is in the range of 70 mol % to 80 mol %.

2. The method for producing a sulfide solid electrolyte material according to claim 1, wherein the sulfide solid electrolyte material has no peaks at $2\theta=21.0°$ and $28.0°$.

3. The method for producing a sulfide solid electrolyte material according to claim 1, wherein
a ratio of the LiI relative to all the components in the raw material composition is more than 5 mol % and less than 15 mol %.

* * * * *